United States Patent [19]
Heath et al.

[11] Patent Number: 5,340,089
[45] Date of Patent: Aug. 23, 1994

[54] COOLANT CONTROLLED IR HEAT TREAT APPARATUS

[75] Inventors: James E. Heath, Fridley; John R. Eppeland, St. James, both of Minn.

[73] Assignee: BGK Finishing Systems, Inc., Blaine, Minn.

[21] Appl. No.: 962,026

[22] Filed: Oct. 15, 1992

Related U.S. Application Data

[63] Continuation of Ser. No. 598,391, Oct. 16, 1990, abandoned, which is a continuation-in-part of Ser. No. 535,468, Jun. 8, 1990, abandoned.

[51] Int. Cl.$^5$ .......................... F27B 15/14; H05B 3/00
[52] U.S. Cl. .................................... 266/87; 266/249; 219/354; 432/58
[58] Field of Search .................. 266/172, 249, 252, 78, 266/87; 219/806, 354; 432/58

[56] References Cited

U.S. PATENT DOCUMENTS

| | | | |
|---|---|---|---|
| 3,204,085 | 8/1965 | Busby, Sr. | 219/346 |
| 3,404,874 | 10/1968 | Wynne | 266/208 |
| 4,241,292 | 12/1980 | Kreick et al. | 219/354 |
| 4,752,061 | 6/1988 | Dalton et al. | 266/87 |
| 4,800,252 | 1/1989 | Steixner | 219/306 |
| 4,818,849 | 4/1989 | Matlen | 219/354 |
| 4,820,906 | 4/1989 | Stultz | 219/354 |

FOREIGN PATENT DOCUMENTS

0372166  6/1990  European Pat. Off.

*Primary Examiner*—Scott Kastler
*Attorney, Agent, or Firm*—Merchant, Gould, Smith, Edell, Welter & Schmidt

[57] ABSTRACT

An apparatus is disclosed for heat treating a product. The apparatus includes an infrared lamp assembly having an infrared lamp disposed within the interior of a quartz conduit. Air is admitted to the interior of the conduit at a controlled rate to cool the conduit while minimizing adverse impact on the efficiency of the infrared lamp.

12 Claims, 3 Drawing Sheets

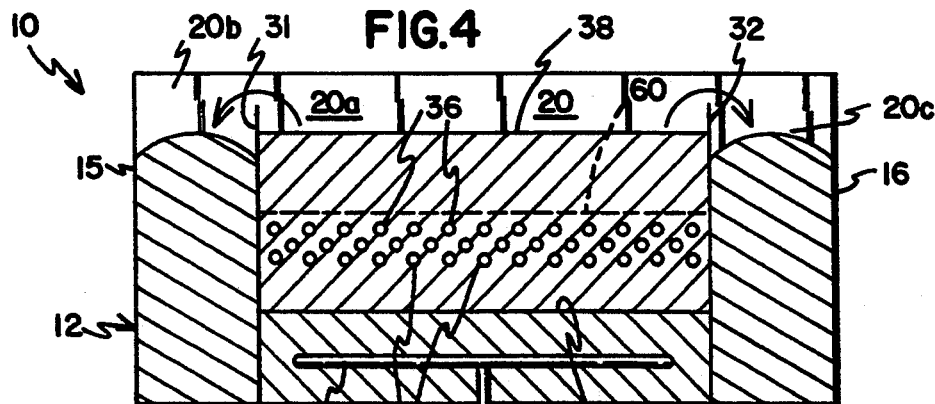
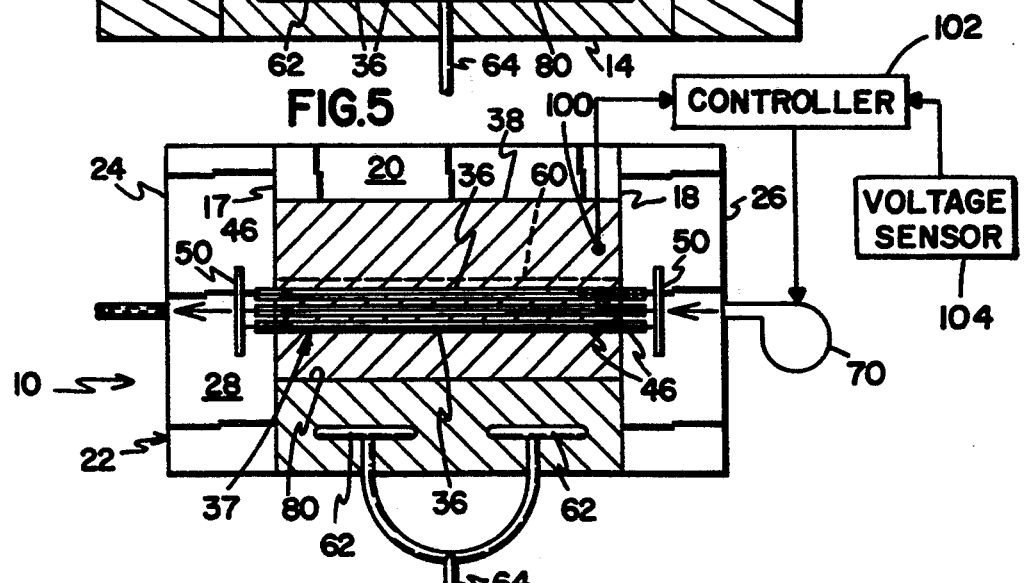
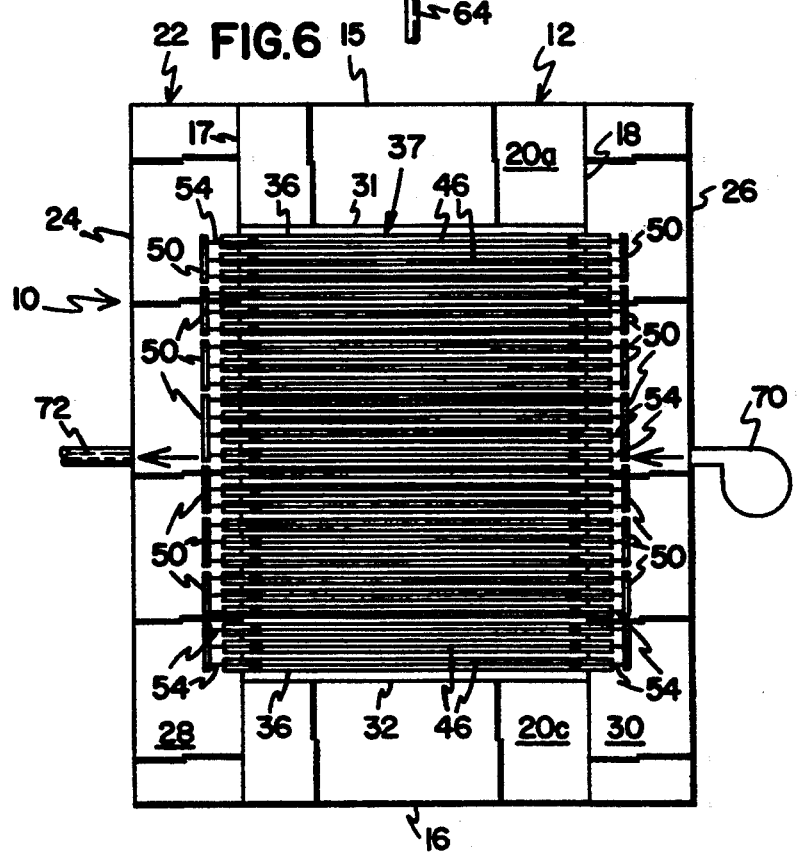

COOLANT CONTROLLED IR HEAT TREAT APPARATUS

I. CROSS-REFERENCE TO RELATED APPLICATION

This is a continuation of application Ser. No. 07/598,391, filed Oct. 16, 1990, now abandoned, which is a continuation-in-part of U.S. patent application Ser. No. 07/535,468 entitled "Fluidized Bed With Submerged Infrared Lamps" filed Jun. 8, 1990 now abandoned. The present application also discloses subject matter disclosed and claimed in copending concurrently filed U.S. application Ser. No. 07/598,415 entitled "Fluidized Bed Apparatus and Method Using Same".

II. BACKGROUND OF THE INVENTION

1. Field of the Invention

This invention pertains to improvements in controlled heat treating. More particularly, this invention pertains to an infrared hub treat source with controlled cooling.

2. Description of the Prior Art

The use of fluidized bed furnaces for heat treating a product is well known. Such furnaces generate an extremely hot bed of fluidizing particles such as aluminum oxide. The furnaces can be used for both continuous processing of a product or batch processing of products.

U.S. Pat. No. 4,752,061 teaches a fluidized bed furnace which uses infrared radiation as the heating source. One advantage of using infrared radiation as the heating source is that it permits the use of inert gases to fluidize the particles in the furnace. As a result, a controlled atmosphere can be provided surrounding the product being heat treated in the furnace.

The aforesaid U.S. Pat. No. 4,752,061 places infrared lamps out of the bed behind a quartz wall or screen. As a result, the distance from the infrared lamps to the bed results in a high temperature gradient with too little of the energy source contributing to the fluidization of the bed. This leads to significant energy inefficiency. Also, the infrared lamps may be in close proximity to the stainless steel retort. This could result in partial melting of the retort.

In the present invention, infrared lamp heat treating assemblies are utilized including infrared sources disposed within transparent conduits. The present invention utilizes means for admitting the cooling fluid to the interior of the conduits.

III. SUMMARY OF THE INVENTION

According to a preferred embodiment of the present invention, an apparatus is disclosed for heat treating a product. The apparatus includes an infrared lamp assembly having an infrared lamp disposed within an infrared transparent conduit. A cooling fluid is applied to the interior of the conduit to cool the conduit walls. The admission of the cooling fluid is controlled to minimize adverse effects of the fluid on the efficiency of the source of infrared radiation.

IV. BRIEF DESCRIPTION OF THE DRAWINGS

FIG. 4 is a side elevation schematic representation of the furnace of the present invention;

FIG. 5 is an end elevation view, shown schematically, of the furnace of the present invention; and FIG. 6 is a top plan view, shown schematically, of the furnace of the present invention.

V. DESCRIPTION OF THE PREFERRED EMBODIMENT

Figure 1:
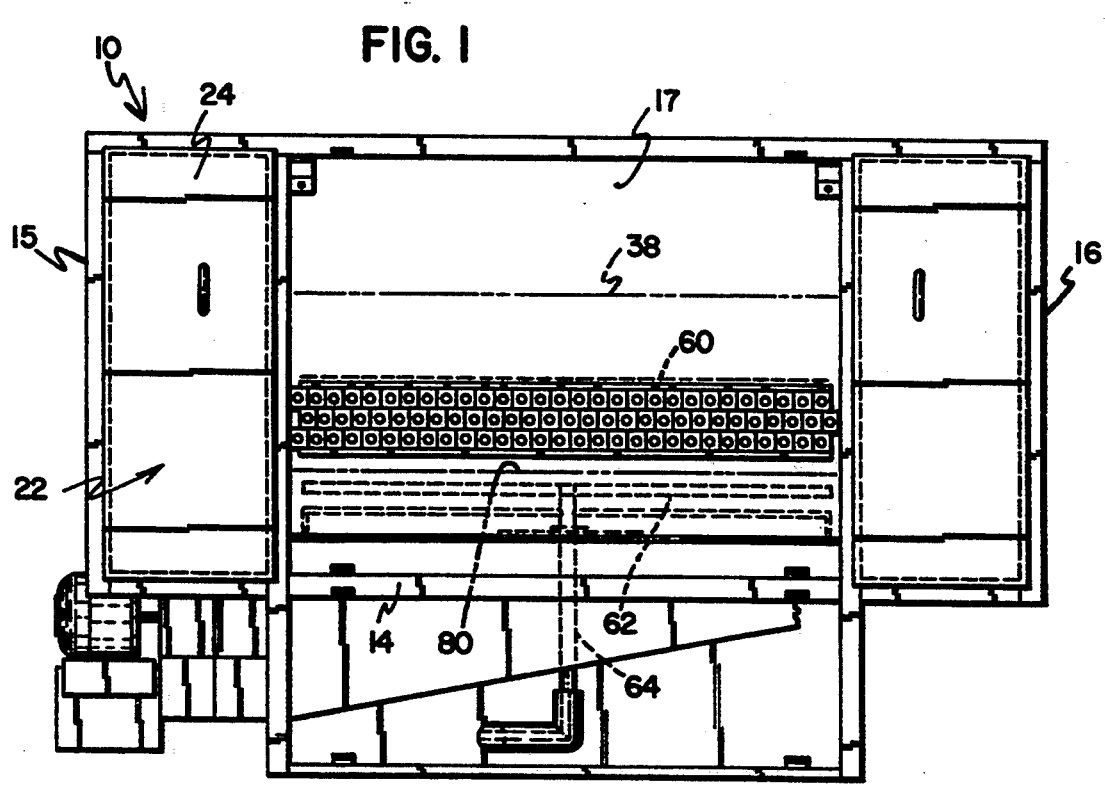
FIG. 1 is a side elevation view of a fluidizing bed furnace according to the present invention, with a portion of an outer skin removed to expose certain interior elements of the furnace.

Referring now to the various figures in which identical elements are numbered identically throughout, the description of the preferred embodiment will now be given with reference to a furnace 10. Shown best in FIGS. 4 and 5, the furnace 10 includes a retort 12, which is preferably formed of R330 stainless steel or the like. The retort 12 includes a bottom wall 14, end walls 15, 16 and side walls 17, 18. Walls 14–18 cooperate to define a retort interior 20. A cover (not shown in the Figures) may be provided to cover the top of the retort 12.

The furnace 10 also includes an outer shell 22 shown best in FIGS. 5 and 6. Outer shell 22 includes a first outer shell wall 24 covering wall 17, and a second outer shell wall 26 covering wall 18. In FIG. 1, a central portion of shell wall 24 has been removed to expose wall 17. Wall 24 and wall 17 cooperate to define an exhaust plenum 28. Walls 26 and 18 cooperate to define an inlet plenum 30.

As best shown in FIGS. 4 and 6, interior divider walls 31 and 32 are provided within the interior 20. Walls 31, 32 extend between side walls 17 and 18 and are parallel to end walls 15 and 16. The divider walls 31, 32 extend from floor 14 partially toward the top of the retort 12. Walls 31, 32 divide retort interior 20 into a fluidizing chamber 20a, a first overflow chamber 20b, and a second overflow chamber 20c (see FIG. 4).

A plurality of quartz tubes 36 are plurality extending between and through walls 17 and 18. As shown, the tubes 36 are disposed in parallel alignment, generally perpendicular to side walls 17, 18 and parallel to the floor 14 of the retort 12. The tubes 36 are disposed within the fluidizing portion 20a of interior 20, and are located beneath a predetermined elevation 38 (see FIG. 4) of fluidizing particles to be retained within the chamber 20a.

Figure 3:
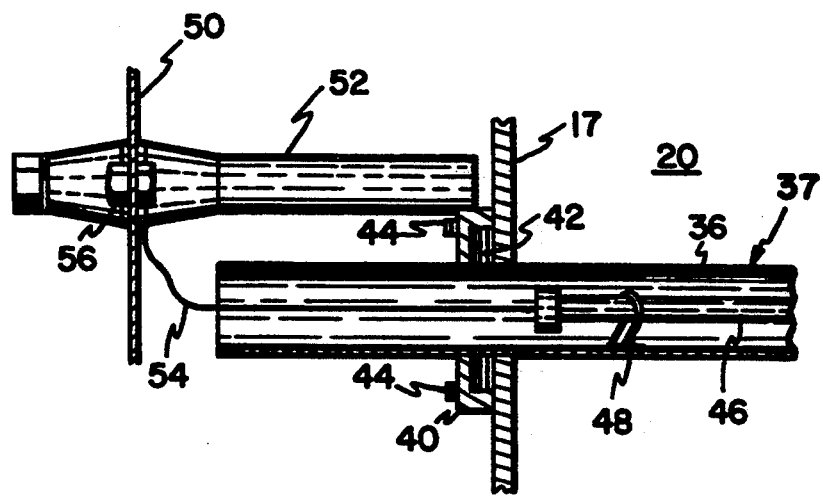
FIG. 3 is a side elevation view, shown partially in section, showing connection of infrared heating elements to bus plates.

FIG. 3 shows attachment of the tube 36 to side wall 17. The quartz tube 36 is similarly attached to side wall 18. As shown in FIG. 3, the tube 36 extends through side wall 17, and is connected to the side wall 17 by a steel mounting clamp 40. The clamp 40 houses a plurality of ceramic washers 42. The clamp 40 is attached to side wall 17 by bolts 44.

An infrared lamp 46 is disposed within each of tubes 36, as best shown in FIGS. 2, 3, 5 and 6, (for clarity, lamps are not shown within the tubes 36 in FIGS. 1 and 4). The lamp 46 is completely contained between walls 17, 18, and is retained in coaxial alignment within tube 36 by a mounting clip 48.

Figure 2:
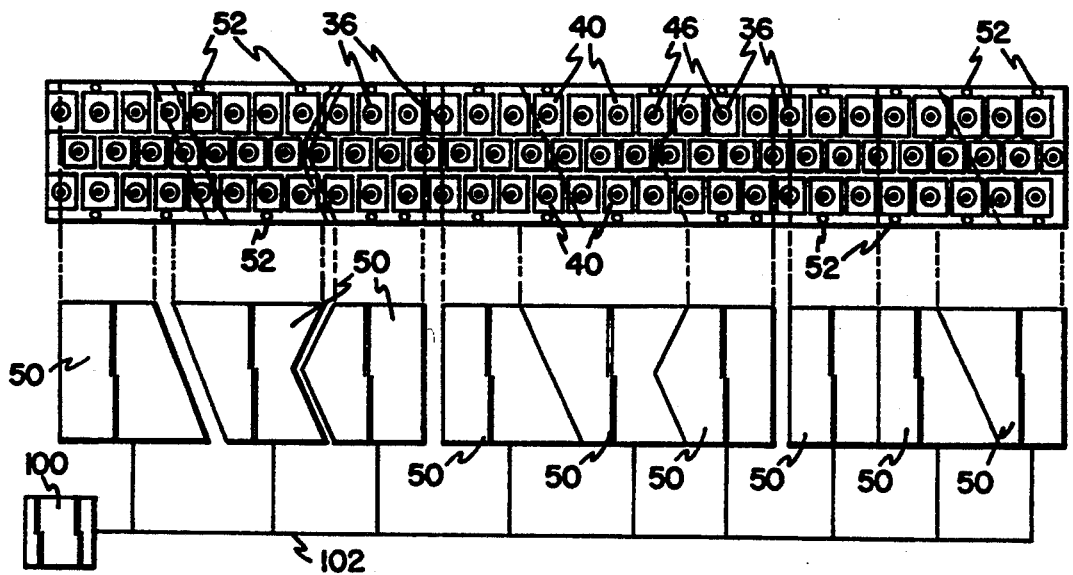
FIG. 2 is an enlarged view of certain of the interior elements of the furnace of FIG. 1, with bus plates shown removed.

To provide electrical energy to the plurality of lamps 46, a plurality of bus bar plates 50 are provided. (For clarity bus bar plates are not shown in FIGS. 1 and 4.) As shown in FIG. 2, nine bus bar plates are provided for each side 17, 18 of the retort 12. In the schematic representation of FIG. 6, eight bus bar plates are shown on each side.

The bus bar plates 50 are electrically conductive plates of metal. Each plate 50 is connected to a separately controllable source (not shown) of electrical power to energize the plate 50.

The plates 50 are secured to the walls 17, 18 by bus bar plate mounts 52 (see FIG. 3), which are preferably ceramic. A lead 54 connects the infrared lamp 46 to the bus bar plate 50. The lead 54 is connected to the bus bar plate 50 by a nut and bolt combination 56.

As best shown in FIG. 2, a plurality of lamps 46 are covered by any given bus bar plate 50. In the expanded view of FIG. 2, each of the bus bar plates 50 is removed from covering the lamps 46 and tubes 36. The positioning of the bus bar plates 50 over the lamps 46 in FIG. 2 is shown in phantom lines. As a result of having a plurality of lamps 46 covered by a plurality of different bus bar plates 50, the length of the fluidizing chamber 20a can be divided into a plurality of zones. Each bus bar plate 50 with its associated lamps 46 constitutes a given zone. By separately regulating a current to each bus bar plate 50, the intensity of the lamps connected to each bus bar plate 50 can be separately controlled. As a result, a temperature gradient can be created across the length of the chamber 20a.

Shown in FIGS. 1, 4 and 5, a stainless steel screen 60 is placed above the lamps 46 and quartz tubes 36. The screen 60 prevents a product that is being heat treated from falling onto the quartz tubes 36 and possibly damaging them.

Fluidizing tubes 62 are provided disposed between the floor 14 and the quartz tubes 36. The tubes 62 are connected via conduit 64 to a source (not shown) of a fluidizing gas. The fluidizing gas may be air or any inert gas such as nitrogen. The fluidizing tubes 62 may be such as those shown and described in U.S. Pat. No. 4,752,061 and indicated by reference numerals 98 in Fig. of that patent.

A coolant mechanism is provided to pass a cooling fluid (preferably air) through the tubes 36 to cool the infrared lamps 46. A blower 70 is provided connected to inlet plenum 30. An exhaust fan (not shown) may be connected through an exhaust conduit 72 to exhaust plenum 28. As a result, cooling air may be forced from plenum 30 through each of tubes 36 into plenum 28 and out exhaust conduit 72.

A bed of fluidizing particles (preferably granular aluminum oxide) is provided within the retort 12. A first layer 80 of coarse particle (preferably of 12 grit size) is provided covering the fluidizing tubes 62 and terminating beneath the quartz tubes 36. Finer aluminum oxide sand (preferably of 100 grit size) rests on top of the coarser sand 80, and terminates at level 38. The coarser sand 80 diffuses the fluidizing gas from the fluidizing tubes 62, and distributes it evenly to the quartz tubes 36.

In operation, the infrared lamps 46 may heat from 0°–4000° F. The aluminum oxide will heat from 0°–2100° F. A controller 100 (schematically shown in FIG. 2) is connected through control lines 102 to each of bus plates 50. Through operation of controller 100, the potential on each of bus plates 50 may be separately controlled. Accordingly, the plurality of infrared lamps 46 are divided into a plurality of separately controllable zones.

In operation, the lamps 46 heat the aluminum oxide. The fluidizing gas from tubes 62 fluidizes the aluminum oxide. The divider walls 31, 32 capture within chambers 20b and 20c any aluminum oxide which spills out of the fluidizing chamber 20a.

Each of lamps 46 and tubes 36 comprise a lamp assembly 37 (shown numbered in FIGS. 3, 5 and 6). As previously indicated, a cooling gas is passed through the lamp assemblies 37. In operation, the temperature of the apparatus can be quite high. For example, the temperature surrounding the assemblies 37 will commonly exceed 2,100° F. At temperatures in excess of 1,500° F., the quartz tubes 36 may deteriorate. For example, from 1,500° to 1,800° F., quartz softens and sags.

The air passing through the quartz tubes 36, cools the quartz tubes 36 to prevent sagging. However, the air flow can adversely effect the efficiency of the infrared lamps 46. Accordingly, air flow through the quartz tubes 36 must be balanced to provide sufficient cooling to prevent the quartz tubes 36 from sagging while minimizing the adverse impact on the efficiency of the lamps 46.

To achieve the desired balancing, air flow through quartz tubes 36 is preferably only provided when the temperature of fluidized the bed 38 exceeds a predetermined temperature in a preferred embodiment, the predetermined temperature is 1,500° F.

The amount of air flow through the tubes 36 is selected to balance the thermal energy on the tubes 36. Namely, the bed 38 draws thermal energy from the tubes 36. If the thermal energy drawn from the tubes 36 is insufficient to keep the temperature of the tubes 36 below the predetermined temperature, air flow is passed through the tubes 36 at a rate selected to draw energy away from the tubes 36. The amount of air flow is a function of the length of the tubes 36, the voltage across the lamps 46 and the ambient temperature (i.e., the temperature of the bed in the immediate vicinity of the tubes 36). The actual amount of air flow is empirically derived for a given apparatus 10 and will vary with the operating process in which it is used.

To achieve the balancing, a thermocouple 100 (schematically shown only in FIG. 5) is provided for sensing the temperature within bed 38 in the vicinity of the tubes 36. Thermocouple 100 provides a signal to a controller 102. The controller 102 also receives an input from a voltage sensor 104 which senses a voltage across the lamps 46. Comparing the voltage on the lamps 46 and the temperature within bed 38, the controller 102 operates blower 70 to force coolant gas through the quartz tubes 36 when the temperature within the bed 38 exceeds the predetermined temperature. The air flow through the quartz tubes 36 is selected to be an increasing function of the voltage across the lamps 46 and to be increasing with the increased temperature measured by thermocouple 100. The increasing function is selected for the air flow to be the minimum air flow necessary to prevent deterioration of the quartz tubes 36.

Through the foregoing detailed description of the present invention, it has been shown how the invention has been obtained in a preferred manner. However, modifications and equivalents of the disclosed concepts, such as those which will readily occur to one skilled in the art, are intended to be included within the scope of this invention.

What is claimed is:

1. An infrared heat treating apparatus comprising:

an infrared radiation emitting infrared lamp extending along a longitudinal dimension from a first lamp end at one end of said dimension to a second lamp end at an opposite end of said dimension;

an infrared transparent conduit extending from a first conduit end to a second conduit end and having wall means for defining a conduit interior, said lamp disposed within said interior in spaced relation to said wall means;

said conduit open at both said first and second conduit ends;

means for admitting a cooling fluid to said interior by admission of said fluid into said first conduit end at a flow rate controlled in response to measured parameters with said fluid flowing through said conduit between said lamp and said wall means and discharged from said conduit at said second conduit end.

2. An apparatus according to claim 1 wherein said conduit wall means is deformable in response to a heat generated by said lamp when a temperature at said wall means exceeds a predetermined minimum temperature;

control means for admitting said cooling fluid to said interior when said temperature at said wall means exceed said predetermined minimum.

3. An infrared heat treating apparatus according to claim 1 wherein said lamp of infrared radiation has an intensity proportional to a voltage applied to said lamp;

control means for controlling admission of said cooling fluid to said interior with said control means admitting said fluid at a rate responsive to a voltage applied to said lamp.

4. An apparatus according to claim 1 wherein said conduit is quartz.

5. An infrared heat treating apparatus comprising:

a source of infrared radiation including an infrared radiating lamp;

an infrared transparent conduit having wall means for defining a conduit interior, said lamp disposed within said interior;

means for admitting a cooling fluid to said interior;

said conduit wall means deformable in response to a heat generated by said lamp when a temperature at said wall means exceeds a predetermined minimum temperature;

measuring means for measuring a temperature at said wall means;

control means responsive to said temperature at said wall means as measured by said measuring means for admitting said cooling fluid to said interior when said temperature at said wall means exceeds said predetermined minimum temperature, with said control means further selected to admit said cooling fluid at a minimum rate sufficient for said wall means to be cooled below a temperature at which deformation of said wall means occurs and with said control means substantially reducing said rate when said temperature is less than said predetermined minimum to a rate selected to avoid inefficiency of said infrared lamp.

6. An infrared heat treating apparatus comprising:

a source of infrared radiation including an infrared radiating lamp;

an infrared transparent conduit having wall means for defining a conduit interior, said lamp disposed within said interior;

said lamp has an intensity proportional to a voltage applied to said lamp;

measuring means for measuring said voltage applied to said lamp;

control means for controlling admission of said cooling fluid to said interior with said control means including means for admitting said fluid at a rate responsive to said voltage applied to said lamp as measured by said measuring means with said rate increasing in response to an increase in said voltage.

7. An apparatus according to claim 5 wherein said conduit is quartz.

8. An apparatus according to claim 5 wherein said source is an infrared lamp.

9. An apparatus according to claim 6 wherein said conduit is quartz.

10. An apparatus according to claim 6 wherein said source is an infrared lamp.

11. An infrared heat treating apparatus according to claim 5 wherein said lamp has an intensity proportional to a voltage applied to said lamp;

said control means further including means for controlling admission of said cooling fluid to said interior with said control mean admitting said fluid at a rate responsive to a voltage applied to said lamp, with said rate increasing in response to an increase in said voltage.

12. An infrared heat treating apparatus according to claim 6 further comprising:

means for measuring a temperature at said wall means;

said conduit wall means deformable in response to a heat generated by said lamp when a temperature at said wall means exceeds a predetermined minimum temperature;

said control means including means responsive to said temperature at said wall means for admitting said cooling fluid to said interior when said temperature at said wall means exceeds said predetermined minimum, with said control means further selected to admit said cooling fluid at a minimum rate sufficient for said wall means to be cooled below a temperature at which deformation of said wall means occurs and with said control means substantially reducing said rate when said temperature is less than said predetermined minimum to a rate selected to avoid inefficiency of said infrared lamp.

* * * * *

UNITED STATES PATENT AND TRADEMARK OFFICE
CERTIFICATE OF CORRECTION

PATENT NO.   :   5,340,089
DATED        :   August 23, 1994
INVENTOR(S)  :   James E. Heath It is certified that error appears in the above-identified patent and that said Letters Patent is hereby corrected as shown below:

Column 4, line 25 delete "the" after the word "fluidized".

Column 6, line 8, insert --means for admitting a cooling fluid to said interior; --after the word "interior;".

Signed and Sealed this

Seventh Day of March, 1995

Attest:

BRUCE LEHMAN

Attesting Officer

Commissioner of Patents and Trademarks